US011103031B1

(12) United States Patent
Dixson

(10) Patent No.: US 11,103,031 B1
(45) Date of Patent: Aug. 31, 2021

(54) TACK STRAP

(71) Applicant: William Dixson, Menomonie, WI (US)

(72) Inventor: William Dixson, Menomonie, WI (US)

( * ) Notice: Subject to any disclaimer, the term of this patent is extended or adjusted under 35 U.S.C. 154(b) by 0 days.

(21) Appl. No.: 16/826,949

(22) Filed: Mar. 23, 2020

Related U.S. Application Data

(60) Provisional application No. 62/822,172, filed on Mar. 22, 2019.

(51) Int. Cl.
*A44B 18/00* (2006.01)
*F16B 5/07* (2006.01)

(52) U.S. Cl.
CPC ............ *A44B 18/0053* (2013.01); *F16B 5/07* (2013.01)

(58) Field of Classification Search
CPC ................................ A44B 18/0053; F16B 5/07
See application file for complete search history.

(56) References Cited

U.S. PATENT DOCUMENTS

| | | | | |
|---|---|---|---|---|
| 4,858,801 A * | 8/1989 | Sameniego | ............ | A45C 13/30 224/264 |
| 4,958,758 A * | 9/1990 | Tipple | ...................... | A45B 1/00 224/220 |
| 5,044,538 A * | 9/1991 | Bader | ....................... | A45F 3/14 224/258 |
| 5,625,929 A * | 5/1997 | Hattori | ................ | A44B 18/0053 24/452 |
| 5,676,642 A * | 10/1997 | Peters | ................... | A61F 5/0127 602/23 |
| 6,073,315 A * | 6/2000 | Rasmussen | ........ | B65D 63/1018 24/16 PB |
| 6,298,524 B1 * | 10/2001 | Officer | .................. | A44B 18/00 24/30.5 R |
| 9,407,743 B1 * | 8/2016 | Hirshberg | ................ | B62J 11/00 |
| 9,919,101 B1 * | 3/2018 | Barnard | ............ | A61M 5/16804 |
| 10,750,807 B1 * | 8/2020 | Proctor | ..................... | A41C 3/12 |
| 2001/0030211 A1 * | 10/2001 | Keton | ....................... | A45F 5/02 224/222 |
| 2004/0065708 A1 * | 4/2004 | Amram | ................... | A45F 3/047 224/579 |
| 2004/0079776 A1 * | 4/2004 | Bauer | ....................... | A45F 5/02 224/269 |
| 2005/0217087 A1 * | 10/2005 | Gallant | ............. | A44B 18/0061 24/452 |
| 2007/0094776 A1 * | 5/2007 | Stevens | .................. | A41F 9/002 2/338 |

(Continued)

*Primary Examiner* — Robert Sandy
*Assistant Examiner* — David M Upchurch
(74) *Attorney, Agent, or Firm* — Dale Jensen, PLC; Dale Jensen

(57) ABSTRACT

Exemplary securement straps comprise an elongated strap having a plurality of fastener surfaces disposed at discrete intervals along the length thereof. Each fastener surface can have a plurality of vertical posts that extend upwardly from the strap and a sphere disposed on each post, such that opposing fastener surfaces frictionally engage and secure to one another via interlocking of the spheres. Fastener surface spacing can create gaps along the strap around which a ratchet mechanism or other strap accessory can be secured. Additionally, the fastener surfaces can be disposed on both sides of the strap such that multiple storage and usage configurations can be achieved. Exemplary securement straps can also have one or more embedded magnets and reflectors for visibility.

9 Claims, 7 Drawing Sheets

(56) References Cited

U.S. PATENT DOCUMENTS

| | | | |
|---|---|---|---|
| 2008/0034560 A1* | 2/2008 | Duffy | A44B 18/0049 |
| | | | 24/452 |
| 2009/0131844 A1* | 5/2009 | Dean | A61F 5/0125 |
| | | | 602/36 |
| 2010/0064486 A1* | 3/2010 | Hanlon | B65D 63/109 |
| | | | 24/442 |
| 2015/0250271 A1* | 9/2015 | Ogilvie | A44B 18/00 |
| | | | 24/444 |
| 2017/0196347 A1* | 7/2017 | Sawhney | A63B 55/408 |

* cited by examiner

2000

TACK STRAP

CROSS-REFERENCES TO RELATED APPLICATIONS

This application claims priority to, and incorporates by reference herein in its entirety, U.S. Provisional Patent Application Ser. No. 62/822,172, filed Mar. 22, 2019.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a securement strap. The securement strap comprises an elongated strap having a plurality of fastener surfaces disposed at discrete intervals along the length thereof. In certain exemplary embodiments, each fastener surface comprises a plurality of vertical posts that extend upwardly from the strap and a sphere disposed on each post, such that opposing fastener surfaces frictionally engage and secure to one another via interlocking of the spheres. Fastener surface spacing can create gaps along the strap around which a ratchet mechanism or other strap accessory can be secured. Additionally, the fastener surfaces can be disposed on both sides of the strap such that multiple storage and usage configurations can be achieved. In various embodiments, the strap further comprises one or more embedded magnets and reflectors for visibility. The device provides a strap that can be easily deployed or stored as needed in a variety of configurations.

Many people utilize straps to secure items, such as while transporting them. Straps that can be used to tie down or secure such items can become tangled and disorganized while not in use and/or in storage. Additionally, knots can form that inconvenience users and/or reduce the effectiveness of the straps. Untangling straps can lead to pulling at the straps. Such pulling can cause straps to wear and, thereby, diminish strap capacity. Wear can cause strap failure in some circumstances. If a strap is not fully secured, or fails, items being transported in a vehicle that are secured by the strap can fall and might become a road hazard. Certain exemplary embodiments provide a user-friendly strap that can be utilized to secure items, and is relatively resistant to tangling (e.g., while in storage).

Figure 1:
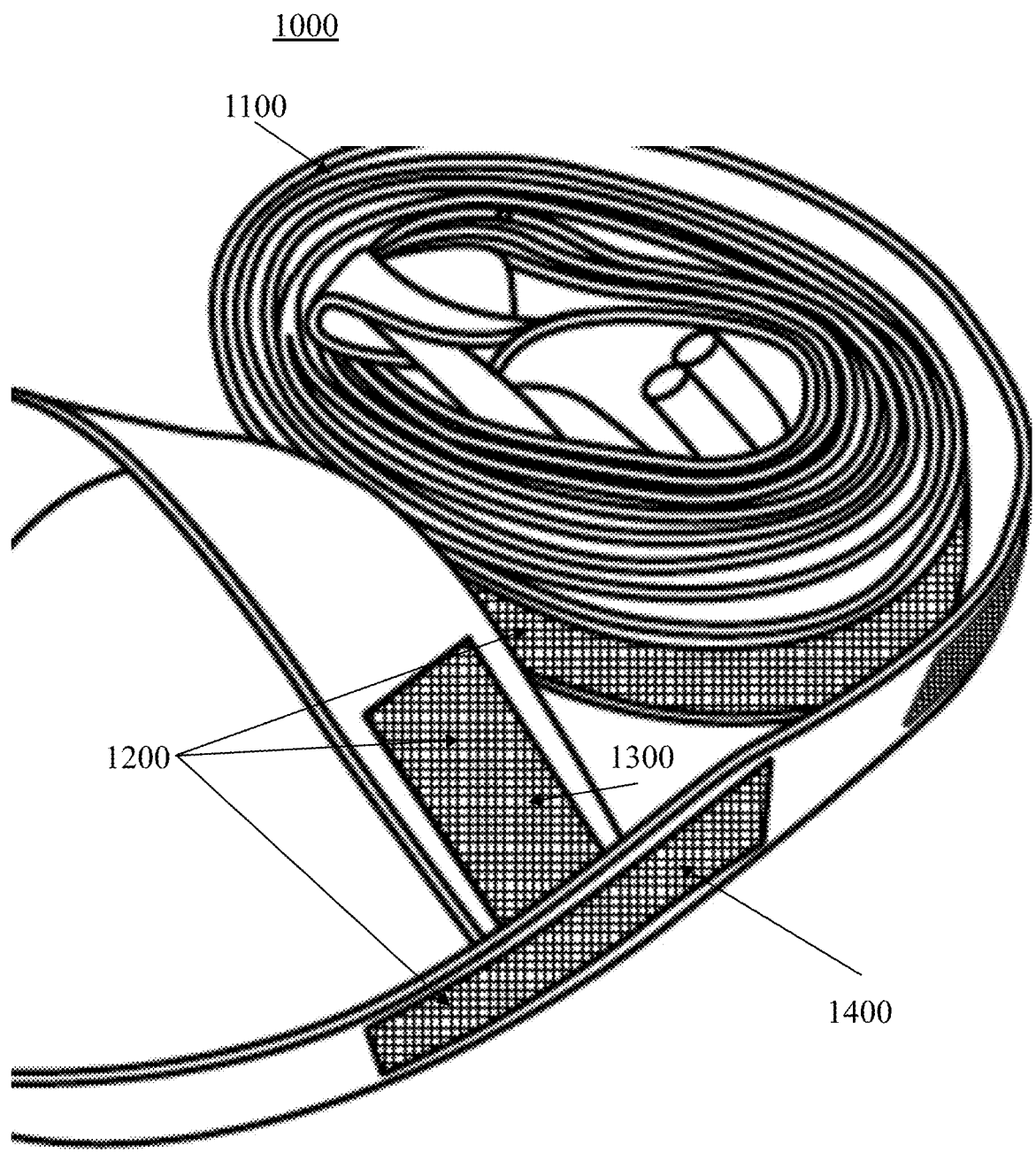
FIG. 1 is a perspective view of an exemplary embodiment of a system 1000.
Figure 4:
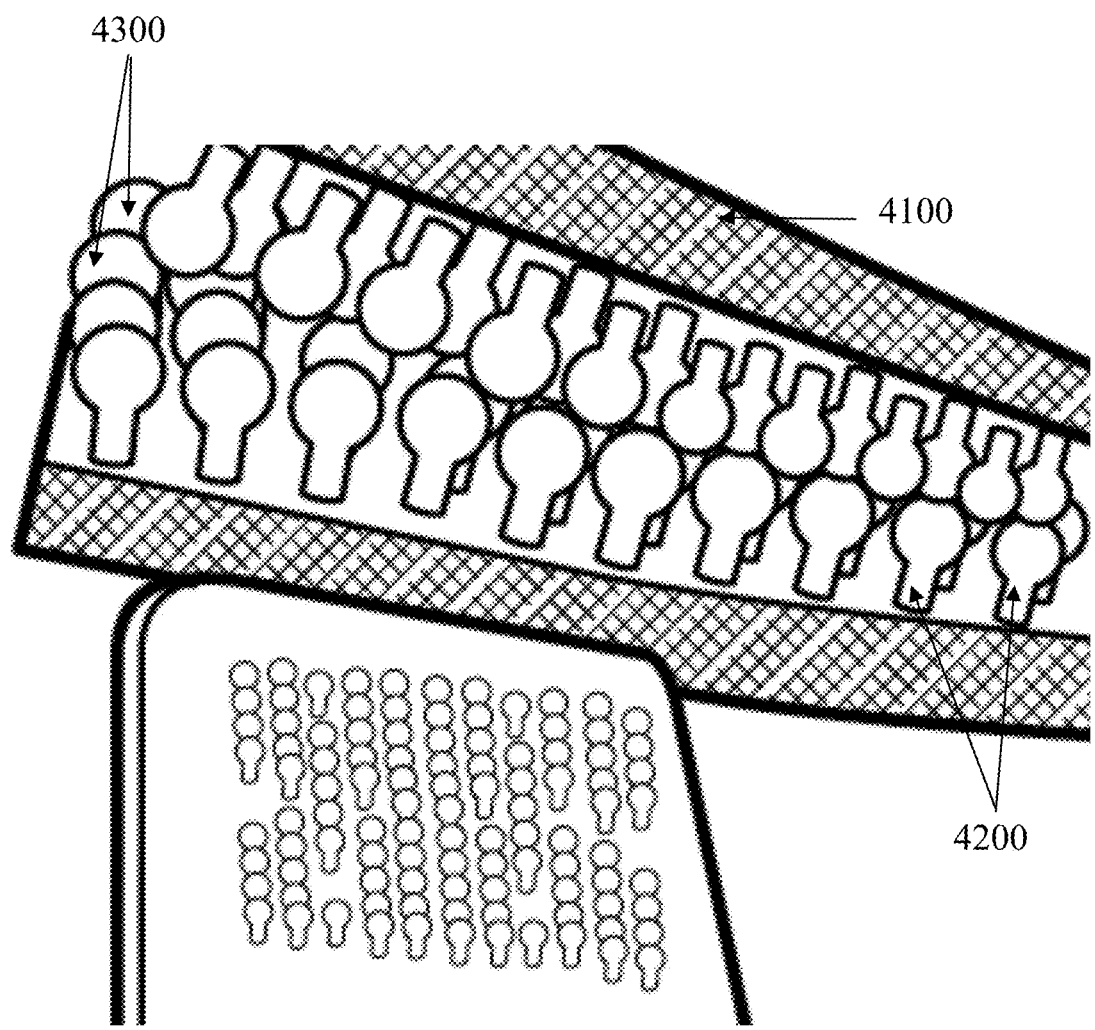
FIG. 4 is a perspective view of an exemplary embodiment of a system 4000.

FIG. 1 is a perspective view of an exemplary embodiment of a system 1000, which comprises a securement strap 1100. FIG. 4 is a perspective view of an exemplary embodiment of a system 4000, which comprises a securement strap 4100, a plurality of vertical posts 4200, and a plurality of spheres 4300. Referring now to FIG. 1 and FIG. 4, there is shown perspective views exemplary embodiments of securement straps, with a focus on sets of interlocking posts and spheres comprised by each of securement strap 1100 and securement strap 4100. Securement strap 1100 comprises a plurality of fastener surfaces 1200 disposed at discrete intervals along the length thereof. Securement strap 1100 is comprised of materials that are durable and flexible, such that contact and rubbing against various items with have minimal effect on the integrity of the strap. In various embodiments, Securement strap 1100 is further comprised of and stretchable materials that are resistant to ultraviolet light exposure, which reduce deleterious effects of exposure to the sun, and to better fit around items that a user desires to secure.

Each of plurality of fastener surfaces 1200 comprises a plurality of vertical posts (see, e.g., plurality of vertical posts 4200 of FIG. 4) that extend upwardly from the strap and a sphere (see, e.g., plurality of spheres 4300 of FIG. 4) disposed on a distil end of each post of the plurality of vertical posts. In the illustrated embodiment a fastener surface 1300 is disposed on a distal portion of securement strap 4100 and an opposing fastener surface 1400 is disposed along the length of securement strap 1100. Fastener surface 1300 and opposing fastener surface 1400 can frictionally engage and secure to one another via interlocking of the spheres and in such a manner the strap is secured at a given length. The interlocking of the spheres provides a secure, but flexible fit, such that flexing the length of the strap that is interlocked does not result in the opposing fastener surfaces from disengaging. In such a manner, the length of the strap, as well as the opposing fastener surfaces remain flexible and are able to adjust to pressure exerted from items that are secured via the securement strap. In one embodiment, the posts are disposed in a figure-eight configuration to maximize the density of the posts in a given space. In such a manner, fastener surface 1300 provides a strop that can be easily deployed or stored as needed in a variety of configurations.

Figure 2:
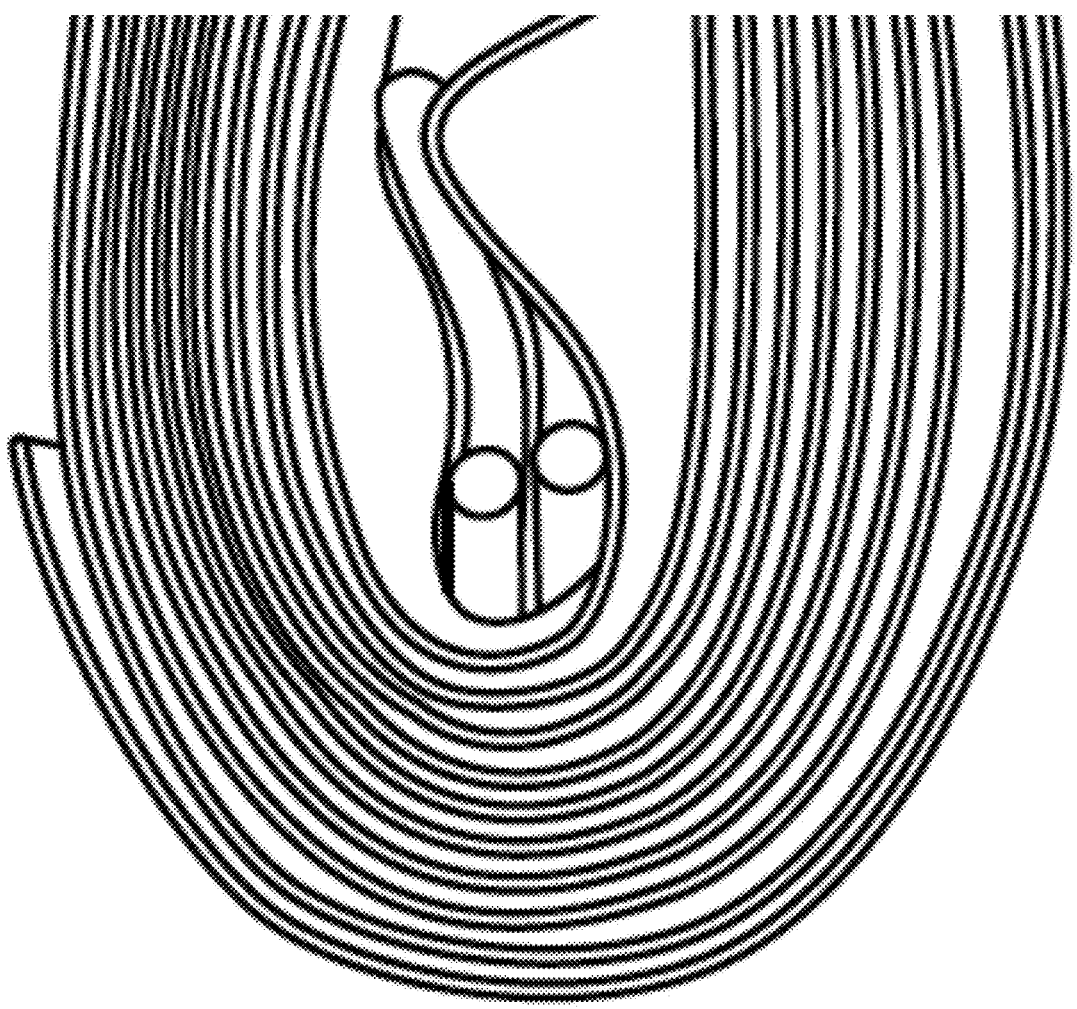
FIG. 2 is a perspective view of an exemplary embodiment of a system 2000.
Figure 3:
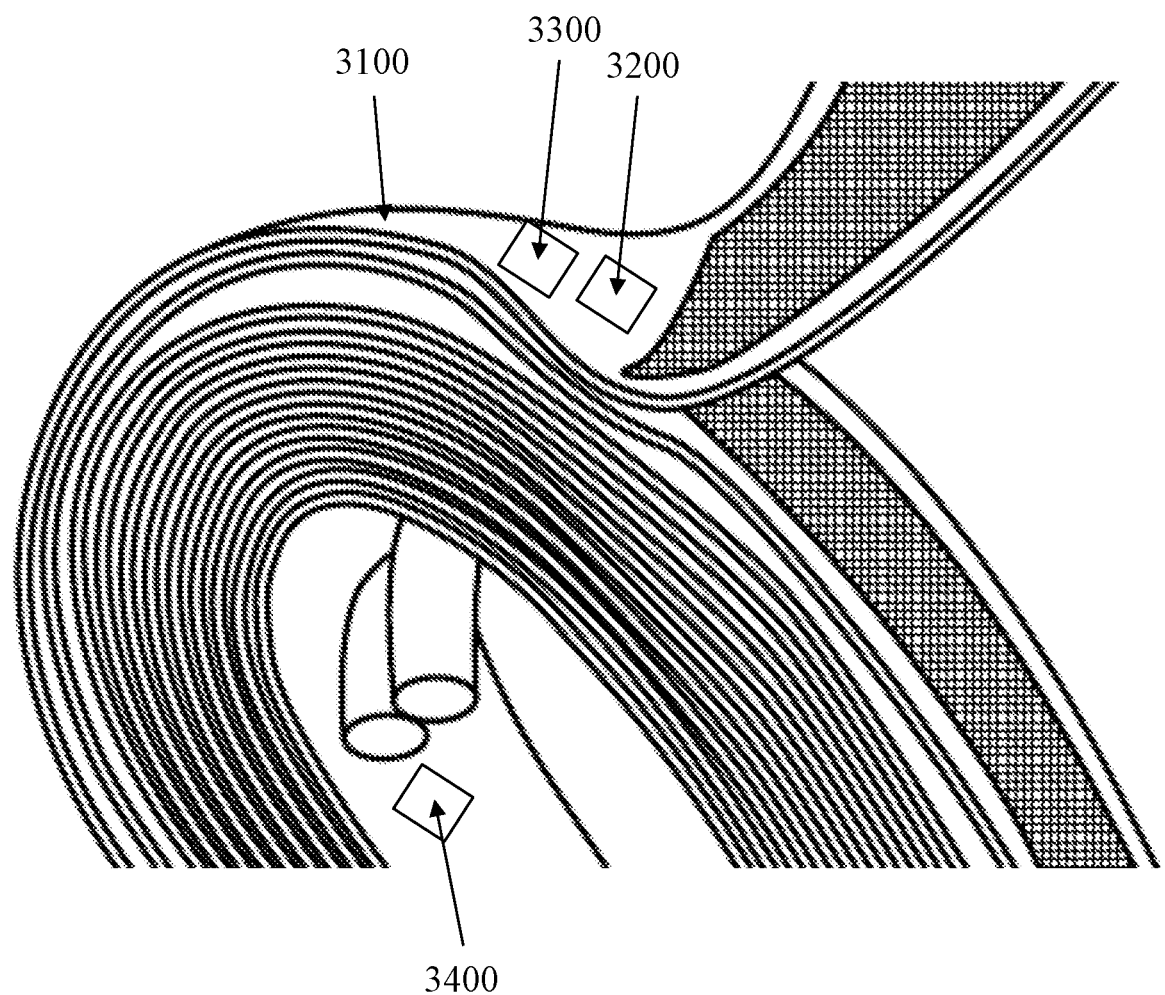
FIG. 3 is a perspective view of an exemplary embodiment of a system 3000.
Figure 5:
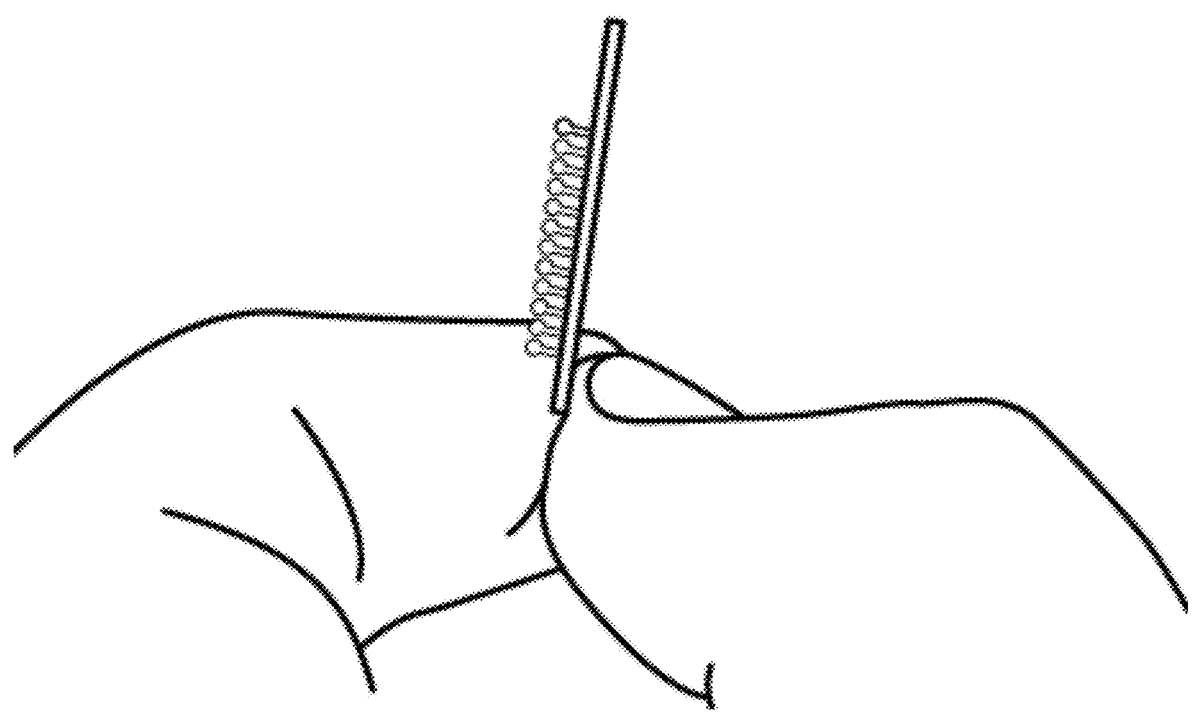
FIG. 5 is a perspective view of an exemplary embodiment of a system 5000.

FIG. 2 is a perspective view of an exemplary embodiment of a system 2000.
FIG. 3 is a perspective view of an exemplary embodiment of a system 3000.
FIG. 5 is a perspective view of an exemplary embodiment of a system 5000.

FIG. 2, FIG. 3, and FIG. 5, illustrate exemplary embodiments of securement straps and components thereof. Spacings of fastener surfaces create gaps along strap 3100 around which a ratchet mechanism or other strap accessory may be secured. In certain exemplary embodiments a plurality of hooks is disposed on a portion of the straps, which provide additional securement points when used to tie down items to a surface such as a truck bed. In other embodiments, various connector elements are incorporated into the strap to provide additional attachment and securement points. Strap 3100 is configured to integrate the plurality of hooks without compromising the integrity of the interlocking of the opposing fastener surfaces. In one embodiment, the fastener surfaces are disposed on both sides of the strap such that multiple storage and usage configurations can be achieved. In one embodiment, the strap further comprises at least one embedded magnet 3200 such that the strap may be magnetically secured to a ferromagnetic material 3300. In a further embodiment, at least one embedded magnet 3200 is disposed on a top surface of the plurality of hooks, thereby enabling a user to use one hand when securing the strap. In another embodiment, the strap can comprise reflectors 3400, which provide for greater visibility when a light source is reflected therefrom.

Figure 6:
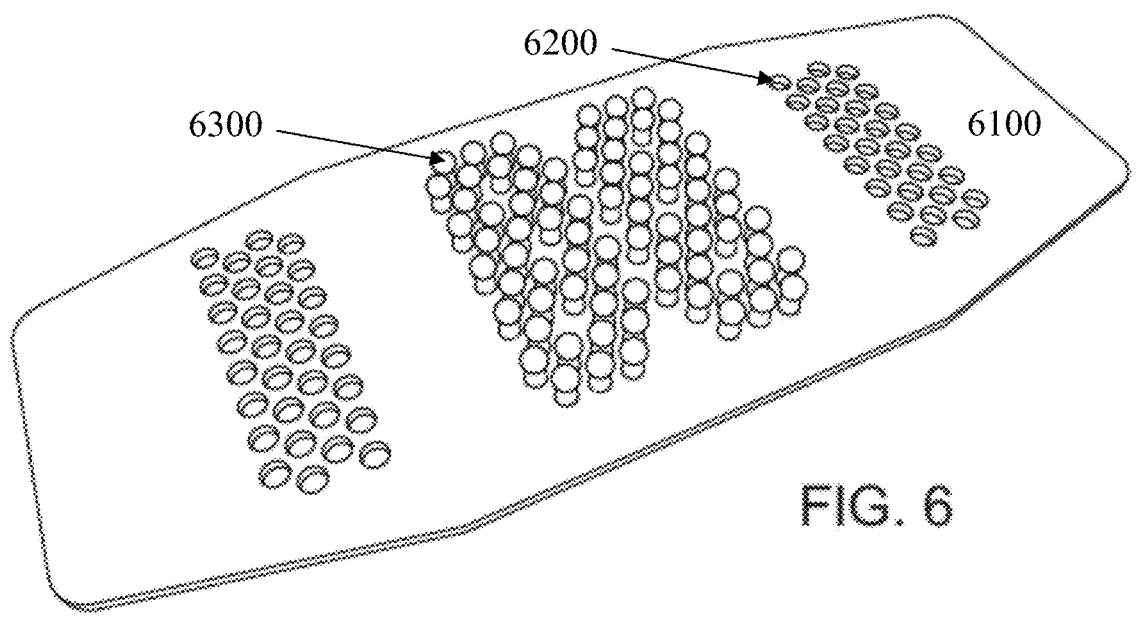
FIG. 6 is a perspective view of an exemplary embodiment of a system 6000.

FIG. 6 is a perspective view of an exemplary embodiment of a system 6000, which comprises a securement pad 6100. Securement pad 6100 defines a set of apertures 6200 and a set of vertical posts 6300. Set of vertical posts 6300 are constructed to engage with a corresponding set of apertures 6200 on an opposing securement pad. Securement pad 6100 is fixedly and/or releasably coupled to a strap (e.g., securement strap 1100 of FIG. 1).

Figure 7:
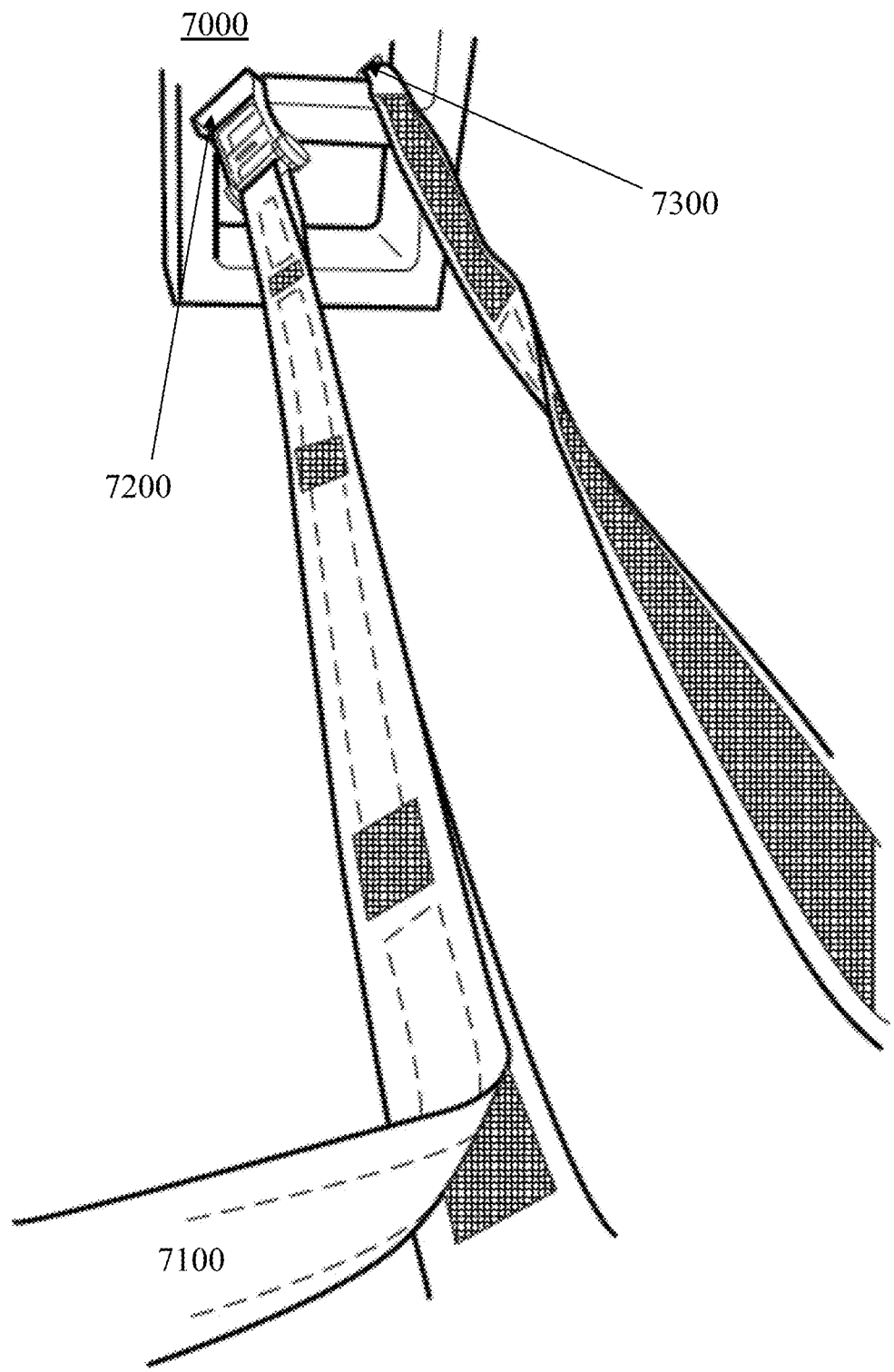
FIG. 7 is a perspective view of an exemplary embodiment of a system 7000.

FIG. 7 is a perspective view of an exemplary embodiment of a system 7000.

System 7000 comprises a ratchet mechanism 7200 coupled to a securement strap 7100. System 7000 comprises a strap accessory 7300 coupled to a securement strap 7100.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- activity—an action, act, step, and/or process or portion thereof
- adapter—a device used to effect operative compatibility between different parts of one or more pieces of an apparatus or system.
- along—at a point on.
- and/or—either in conjunction with or in alternative to.
- apparatus—an appliance or device for a particular purpose.
- aperture—an opening in something.
- associate—to join, connect together, and/or relate.
- can—is capable of, in at least some embodiments.
- cause—to produce an effect.
- comprising—including but not limited to.
- configure—to make suitable or fit for a specific use or situation.
- connect—to join or fasten together.
- constructed to—made to and/or designed to.
- convert—to transform, adapt, and/or change.
- couple—to link in some fashion.
- coupleable—capable of being joined, connected, and/or linked together.
- create—to bring into being.
- define—to establish the outline, form, or structure of
- determine—to obtain, calculate, decide, deduce, and/or ascertain.
- device—a machine, manufacture, and/or collection thereof.
- discrete—separate.
- disposed—something set in a particular place.
- engage—to be in contact and interact with.
- extend—to continue in a specified direction.
- fastener surface—the outer boundary of an object or a material layer that when pressed into an opposing fastener surface releasably couples two fastener surfaces together.
- ferromagnetic material—a substance with an abnormally high magnetic permeability, a definite saturation point, and appreciable residual magnetism and hysteresis.
- frictionally—via a force resisting a relative motion of solid surfaces, fluid layers, and material elements sliding against each other.
- generate—to create, produce, give rise to, and/or bring into existence.
- initialize—to prepare something for use and/or some future event.
- install—to connect or set in position and prepare for use.
- interlock—to unite or join closely.
- interval—a space between components.
- length—a longest extent of something as measured from end to end.
- magnet—a material or object that produces a magnetic field.
- magnetic field—a portion of space near a magnetic body or a current-carrying body in which the magnetic forces due to the body or current can be detected.
- may—is allowed and/or permitted to, in at least some embodiments.
- method—a process, procedure, and/or collection of related activities for accomplishing something.
- opposing—to be positioned so as to face something or be on an opposite side of something.
- perpendicular—meeting at substantially right angles.
- plurality—the state of being plural and/or more than one.
- post—a piece fixed in a position that is substantially perpendicular to a surface.
- predetermined—established in advance.
- provide—to furnish, supply, give, and/or make available.
- ratchet mechanism—a system that comprises a bar or wheel having inclined teeth into which a pawl drops so that motion can be imparted to the wheel or bar, governed, or prevented and that is used in a hand tool (e.g., a wrench or screwdriver) to allow effective motion in only one direction at a time.
- receive—to get, take, acquire, and/or obtain.
- reflect—to cast back light from a surface.
- reflector—a component comprising a surface that reflects light.
- repeatedly—again and again; repetitively.
- request—to express a desire for and/or ask for.
- securement strap—a flexible strip of material constructed to bind objects and coupleable to a ratchet mechanism.
- select—to make a choice or selection from alternatives.
- set—a related plurality.
- side—a bounding surface of an object.
- sphere—a three-dimensional object that resembles a ball.
- store—to place, hold, and/or retain.
- strap accessory—an object coupleable to a securement strap that couples the strap to something.
- substantially—to a great extent or degree.
- support—to bear the weight of, especially from below.
- system—a collection of mechanisms, devices, machines, articles of manufacture, processes, data, and/or instructions, the collection designed to perform one or more specific functions.
- transmit—to send, provide, furnish, and/or supply.
- upward—toward the sky and away from the earth.
- vertical—substantially perpendicular to horizontal.
- via—by way of and/or utilizing.

weight—the force with which a body is attracted toward Earth, equal to the product of the object's mass and the acceleration of gravity.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:
- there is no requirement for the inclusion of any particular described or illustrated characteristic, function, activity, or element, any particular sequence of activities, or any particular interrelationship of elements;
- no characteristic, function, activity, or element is "essential";
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a securement strap, the securement strap comprising a plurality of fastener surfaces disposed at discrete intervals along a length of the securement strap, each of the plurality of fastener surfaces comprising:
      a plurality of vertical posts that extend perpendicularly from a fastener surface base; and
      a sphere disposed on each vertical post of the plurality of vertical posts; and
   a ratchet mechanism coupleable to the securement strap.

2. The system claim 1, wherein:
   opposing fastener surfaces are constructed to frictionally engage and couple to one another via interlocking of the spheres.

3. The system claim 1, wherein:
   each of the plurality of fastener surfaces defines a set of apertures, the set of apertures constructed to engage with a plurality of vertical posts of an opposing fastener surface of the plurality of fastener surfaces.

4. The system claim 1, wherein:
   opposing fastener surfaces are disposed on both sides of the securement strap.

5. The system claim 1, further comprising:
   a strap accessory coupleable to the securement strap.

6. The system claim 1, further comprising:
   a magnet coupled to the securement strap; and
   a ferromagnetic material to which the magnet is releasably coupleable.

7. The system claim 1, further comprising:
   a reflector coupled to the securement strap.

8. A system comprising:
   a securement strap, the securement strap comprising a plurality of fastener surfaces disposed at discrete intervals along a length of the securement strap, each of the plurality of fastener surfaces comprising:
      a plurality of vertical posts that extend perpendicularly from a fastener surface base; and
      a sphere disposed on each vertical post of the plurality of vertical posts;
   a magnet coupled to the securement strap; and
   a ferromagnetic material to which the magnet is releasably coupleable.

9. A system comprising:
   a securement strap, the securement strap comprising a plurality of fastener surfaces disposed at discrete intervals along a length of the securement strap, each of the plurality of fastener surfaces comprising:
      a plurality of vertical posts that extend perpendicularly from a fastener surface base; and
      a sphere disposed on each vertical post of the plurality of vertical posts;
   a magnet coupled to the securement strap; and
   a reflector coupled to the securement strap.

\* \* \* \* \*